United States Patent [19]

Masaki

[11] Patent Number: 5,126,636
[45] Date of Patent: Jun. 30, 1992

[54] LIGHTING DEVICE

[75] Inventor: Kazumi Masaki, Osaka, Japan

[73] Assignee: Ken Kayashibara, Okayama, Japan

[21] Appl. No.: 557,043

[22] Filed: Jul. 25, 1990

[30] Foreign Application Priority Data

Jul. 27, 1989 [JP] Japan .................................. 1-195365

[51] Int. Cl.$^5$ ............................................. H05B 37/00
[52] U.S. Cl. .................... 315/291; 315/200 R; 315/205
[58] Field of Search .................. 315/200 R, 291, 205, 315/DIG. 7; 363/132

[56] References Cited

U.S. PATENT DOCUMENTS

| | | | |
|---|---|---|---|
| 4,001,637 | 1/1977 | Gray | 315/200 R |
| 4,506,318 | 3/1985 | Nilssen | 363/132 |
| 4,752,719 | 6/1988 | McEwan | 315/200 R |

OTHER PUBLICATIONS

Sylvania (GTE), Designers Handbook Light Source Applications, 1990, pp. 11-12.

Primary Examiner—Eugene R. LaRoche
Assistant Examiner—Son Dinh
Attorney, Agent, or Firm—Browdy and Neimark

[57] ABSTRACT

Disclosed is a novel lighting device comprising a power source capable of supplying to an argon lamp a voltage exceeding its rating, and an argon lamp connected with an output terminal of said power source. Argon lamp emits a natural light when lighted by energizing a voltage exceeding the rating. Such a light has superior color rendering properties, as well as a color temperature of about 2,900° K. or higher which is very close to that of that of early morning sunlight. Thus, the lighting device is advantageously used in luminares in general.

8 Claims, 5 Drawing Sheets

LIGHTING DEVICE

BACKGROUND OF THE INVENTION

1. Field of the invention

The present invention relates to a lighting device using an argon lamp as the light source; in particular, to a lighting device wherein an argon lamp is lighted by energizing a voltage exceeding its rating.

2. Description of the prior art

Recently, the number of school children with pseudomyopia and workers with eyestrain is steadily increasing. This would be due to long-time TV and fine print watching under inappropriate lighting, as well as to increasing VDT task. Recent tendency prefers lighting devices which makes a person to recognize the color of an article as it really is, and repeated discussions have been focused on color rendering properties of lighting.

Light sources which have been extensively used in lighting devices are fluorescent and incandescent lamps. Fluorescent lamp has the merit that its relatively high total flux provides a bright lighting, as well as having the demerits that its flicker tends to cause eyestrain, and that the unbalance between total flux and color temperature deteriorates the color rendering properties to make articles look paler than they really are.

Although incandescent lamp is superior to fluorescent lamp because the well balance between total flux and color temperature achieves satisfiable color rendering properties, incandescent lamp has the demerit that it is generally low in total flux and this tends to cause eyestrain when used in lighting for long time.

In order to overcome these drawbacks of conventional lighting device, the present inventor investigated incandescent lamps having superior color rendering properties. As the result, the present inventor found that a light obtained by applying to an incandescent lamp a voltage exceedings its rating attains a color temperature approximately the same as that of early morning sunlight (about 3,000 K.) which is comfortable to the eyes, as well as that such a light is suitable for general lighting. The present inventor disclosed these in Japanese Patent Laid-Opens No.193,398/86, No.185,516/87, No.26,909/88 and No.88,792/88.

The present inventor also found that in the case of argon lamps wherein argon gas is enclosed as the filling gas, many of the argon lamps as tested, however, emitted no natural light which had both a color temperature of about 2,900 K. or higher, desirably, in the range of about 2,950–3,050 K., and superior color rendering properties when energized with an overvoltage which fell within a practical range chosen in consideration with service life and safeness.

SUMMARY OF THE INVENTION

In view of the foregoing, the present inventor investigated the characteristic of lights which were obtained by energizing to various argon lamp of different rated voltage, rated wattage and shape a voltage exceeding their rating.

As the result, the present inventor found that in some of the argon lamps as tested, the color temperature of the emitted light did not increase proportionally to the applied voltage exceeding their rating, generally, in the range of about 105–125% thereof, as well as that the increment of color temperature stopped far about 2,900 K. yielding no natural light with superior color rendering properties.

Also was found that in order to obtain a natural light having both a color temperature of about 2,900 K. or higher, desirably, in the range of about 2,950–3,050 K. and superior color rendering properties, it is unnegligible to use an argon lamp which emits a light with a color temperature increasing proportionally to the applied voltage.

More particularly, the present invention relates to a lighting device using an argon lamp as the light source, characterized by providing a power source capable of supplying to an argon lamp a voltage exceeding its rating; and lighting said argon lamp by energizing a voltage exceeding its rating to allow said argon lamp to emit a light with a color temperature of about 2,900 K. or higher.

DETAILED DESCRIPTION OF THE INVENTION

The present invention is to light an argon lamp as the light source with a voltage exceeding its rating to allow it to emit a light with a color temperature of about 2,900 K. or higher, desirably, in the range of about 2,950–3,050 K., which is natural, tender to the eyes and superior in color rendering properties.

The wording "argon lamp" as referred to in the invention means incandescent tungstein filament lamp wherein the filling gas comprises or consists of argon gas. Any argon lamp can be used in the invention regardless of their rated voltage, rated wattage, efficiency and shape, provided that it emits a continuous light having a color temperature of about 2,900 K. or higher, desirably, in the range of about 2,950–3,050 K. when energized with a voltage exceeding its rating, desirably, in the range of about 105–125% thereof. In view of color rendering properties, it is desirable to choose a voltage which attains a total flux of about 1,000 lumens or higher, desirably, in the range of about 1,050–1,200 lumens.

Such an argon lamp is a commercialized argon lamp with a rated wattage of 25–150 watts, desirably, 40–60 watts, or that which is specially designed and prepared to give a desired rated voltage, rated wattage, efficiency and shape. Particularly, commercially-available argon lamps, for example, "SOFT-WHITE 120 V 60 W", "STANDARD 120 V 60 W" and "INSIDE FROST 130 V 60 W", products of General Electric Co., Conn., USA, and "INSIDE FROST 120 V 60 W", a product of N. V. Philips' Gloeilampenfabrieken, Eindhoven, the Netherland, are easily allowed to emit a natural light having both a color temperature of about 2,900 K. or higher and superior color rendering properties by energizing an overvoltage up to about 105% of the rating. Such an overvoltage is within a variation as usually observed in commercial ac line, and any shortening of service life due to the overvoltage causes no serious problem when in practical use.

The power source to supply to such an argon lamp a voltage exceeding its rating is that which can supply to the argon lamp an ac or a dc voltage exceeding its rating, desirably, in the range of about 105–125% thereof when connected with one or more argon lamps to the output terminal(s). Such power source can be stabilized with an electric circuitry.

To supply to an argon lamp an ac voltage exceeding its rating, for example, an ac or a dc voltage from commercial ac line, generator or battery is controlled with a suitable means such as transformer and power converter into a voltage exceeding the rating, desirably, in the range of about 105–125% thereof, and then applied to the argon lamp: For example, a lamp lighting device disclosed in Japanese Patent Laid-Open No.136,492/88 by the present inventor is suitable for such power source.

To supply to an argon lamp a dc voltage exceeding its rating, besides using battery, an ac voltage, for example, from commercial ac line or generator is rectified and smoothed with a rectifier circuit bearing a smoothing means, and the obtained dc voltage exceeding the rating of the argon lamp, desirably, in the range of about 105–125% thereof is supplied to the argon lamp: For example, lamp lighting devices disclosed in Japanese Patent Laid-Opens No.193,398/86, No.185,516/87 and No.26,909/88 by the present inventor are extremely suitable for such power source.

Further, an ac voltage, for example, from commercial ac line or generator is rectified and smoothed with a first rectifier circuit bearing a smoothing means, and the obtained dc voltage is fed to an inverter circuit into a high-frequency voltage which is then applied intact to an argon lamp, or converted with a second rectifier circuit into a dc voltage exceeding the rating, desirably, in the range of about 105–125% thereof, prior to application to the argon lamp. Although in this case a capacitor with a relatively small capacitance is generally used as the smoothing means in the second rectifier circuit, such smoothing means may be omitted.

Furthermore, such an inverter circuit and a second rectifier circuit can be modified into a switching power circuit or switching regulator by providing a comparator circuit at an output terminal of a dc/dc power converter circuit comprising the inverter circuit and second rectifier circuit; an amplifier circuit connected with the comparator circuit for the amplification of the signal therefrom: and an on/off time duty regulator circuit which effects on/off regulation for the inverter circuit in accordance with the signal from the comparator. Such a switching power source is characterized in that it easily miniaturizes the power means because of its high efficiency; that the efficiency does not vary so much even when the input voltage is varied; and that the output voltage can be easily regulated. These features are very convenient in case that two or more argon lamps are energized with one lighting device: that a lighting device may be subjected to a relatively large voltage variation: and that a lighting device having a relatively high power capacity is housed in a limited space. Particular switching power sources are those of the chopper, forward, center-tapping, half-bridge and full-bridge types.

Among the above described methods, the method wherein an ac voltage is converted with a rectifier circuit bearing a smoothing means into a dc voltage which is then applied to an argon lamp is superior to the other two methods because of the facts that the power source for this method can be so simplified that a voltage exceeding the rating, desirably, in the range of about 105–125% thereof can be easily obtained only by controlling the capacitance of the smoothing means; and that the obtained light is very useful in general lighting because it is flickerless, much more natural and closer to the sunlight than that obtained by lighting the same argon lamp with an ac voltage exceeding the rating.

The light obtained in this way, usually, has a color temperature of about 2,900 K. or higher, desirably, in the range of about 2,950–3,050 K., and the service life at this time is usually about 50 hours or longer which causes no serious problem when practically used.

Especially, the present inventor found that, in case wherein an argon lamp is lighted by energizing a dc voltage obtained by rectifying and smoothing an ac voltage with a rectifier circuit which bears a smoothing means, one can safely obtain with the argon lamp a flickerless, natural light having a color temperature of about 2,950 K. or higher, desirably, in the range of about 2,950–3,050K over a time period of about 100 hours or longer, desirably, in the range of about 200–1,000 hours by providing a zerocross-starting circuit in the power source and/or an arc discharge current-limiting circuit and a rush current-limiting circuit respectively at an ac terminal and a dc terminal of the rectifier circuit.

When a plurality of argon lamps are successively changed and lighted at prescribed time intervals, the life of one argon lamp is much more prolonged than in the case of lighting one argon lamp in continuous manner.

Accordingly, the lighting device according to the invention is advantageously usable as table and desk lightings, for example, adjustable lamp, desk lamp, hurricane lamp, table lamp and mini lamp; indoor and outdoor lightings, for example, ceiling fixture, down light, wall fixture, pendant, chandelier, swag lamp and floor lamp, garden lamp and porch for the lighting of study room, children's room, bed room, living room, dining room, kitchen, toilet room, washroom, bath room, passage, stairs, balcony and porch in detached house, apartment house and multiple house, as well as for lighting of reading room, schoolroom, hall, lobby, waiting room, treating room, control room, office room, drawing room, laboratory, lounge, guest room, clerk room, cooking room, operating room and cultivating room in facilities such as library, school, studio, beauty salon, hospital, factory, office, "ryokan (Japanesestyle hotel)", hotel, restaurant, banquet hall, wedding hall, conference hall, store, shop, supermarket, department store, art museum, museum, concert hall, hall, airplane, vehicle, pool, gymnasium, sports ground, poultry farm, fish farm and plant factory.

One or more lighting units prepared according to the invention can be subjected to a lighting pattern control, time schedule control, daylight interlocking control, wall switch control, centralized control and/or dimming control by appropriately locating the lighting unit(s) in the above described house and facilities, and subjecting the lighting unit(s) to a lighting control system using dimming and switching circuits, for example, wire control systems such as individual wiring system, personal wiring multiplex system, telephone line system, power line carrier system and optical fiber system and wireless control systems such as electric wave control system, light control system, ultrasonic control system and acoustic control system. Particularly in household lighting, one or more lighting devices of the present invention can be totally controlled together with other electric equipments by incorporating the lighting device(s) into a home bus system.

In addition, since the present lighting device provides a natural light which is close to early morning sublight and exhibits remarkable effects in the prevention and treatment of diseases, for example, pseudomyopia, asthenopia and depression and also in the improvement of growth and productivity of animals and plants, the lighting device can be advantageously used to practice physical therapy at home and infirmaries such as hospital and clinic, as well as a lighting device for farms and factories such as poultry farm, fish farm and plant factory.

The light obtained by lighting an argon lamp by energizing a voltage exceeding its rating is rich in infrared component, in particular, a far-red component with a wavelength of 25–1,000 microns. The far-red component has an activity of accelerating the perspiration, oxygen intake and blood circulation in animals to promote or improve their metabolism, lowering of blood pressure and blood sugar, excretion of metabolic products, relieving of obesity and rehabilitation, as well as having an activity of relieving inflammatory pains and spasms.

Accordingly, the lighting device of the invention exhibits remarkable effects in the relaxation of myonic tonus by stiff shoulder and myalgia; in the relieving of spasms and dorsal pains by trauma, burn, rheumatism, arthritis, lambago, neuralgia, extermal otitis, tymanitis, nasosinusitis, tonsillitis, pharyngitis, laryngitis, throaty voice, and visceral diseases: and in the prevention and treatment of geriatric diseases such as cancer, hepatitis and hepatocirrhosis when equipped with an argon lamp using a lead-free or low lead content glass bulb for higher infrared transmission. Such lighting device can be advantageously used to practice physical therapy at home and infirmaries such as hospital and clinic.

Further, since a light rich in infrared exhibits a remarkable germicidal activity on microorganisms, as well as accelerating the growth of plants, the present lighting device can be advantageously used as a germicidal lamp, as well as a lighting for cultivating rooms such as plant factory.

DESCRIPTION OF THE PREFERRED EMBODIMENTS

The present invention will be further explained with reference to the accompanying drawings, in which.

Throughout the figures, reference numeral (1) designates arc discharge current-limiting circuit; (2), rush current-limiting circuit; (3), lighting control device; (4), inverter circuit; D, rectifier diode; AL, argon lamp; AC, ac power source; SW, switch; R, resistor; C, capacitor; T, transformer; Tr, transistor; L, inductor or winding; Q, thyristor; Z, zener diode; Th, thermistor; U, lighting unit; and F, fuse.

Figure 1:
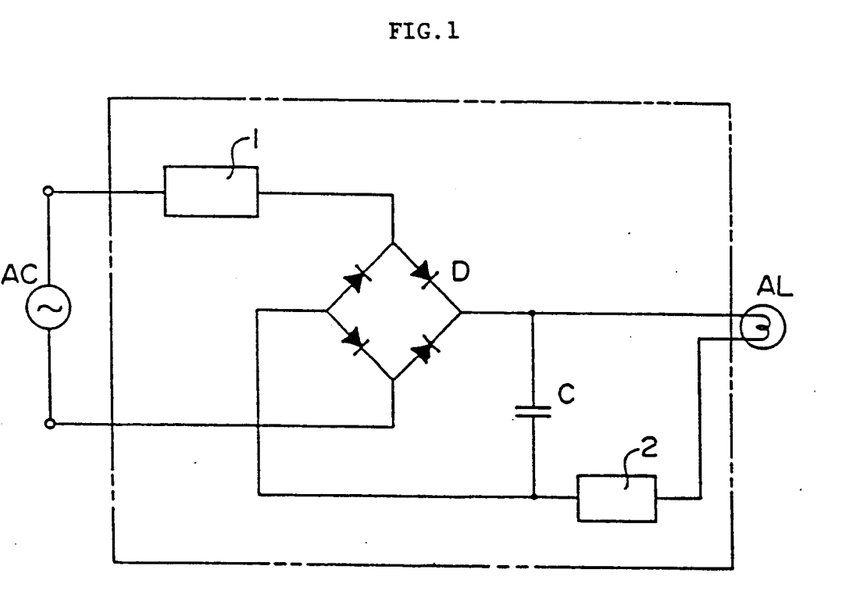
FIG.1 is a block diagram of a lighting device according to the invention.

Now referring to FIG.1, a rectifier circuit comprising a bridge rectifier D and a smoothing capacitor C is connected to an ac terminal of an ac source AC through an arc discharge current-limiting circuit (1), while an argon lamp AL is connected with a dc terminal of the bridge circuit D through a rush current-limiting circuit (2).

The arc discharge current-limiting circuit (1), usually comprising an inductor, capacitor and/or resistor, is to limit an arc discharge current which may occur upon burnout of lamp filament, as well as to stop the arc discharge per se. Such an arc discharge usually occurs in short-circuit manner to arise in the main current circuit a continuous current surge of up to 200 amperes which has a possibility of greatly damaging circuits elements such as rectifier and thyristor.

The inductance, capacitance and resistance of the inductor, capacitor and resistor used in the arc discharge current-limiting circuit (1) are set in such manner that, when the main current circuit is in stationary state, they cause no substantial voltage drop at the ac terminal of the rectifier D, but effectively limits an arc discharge current to suspend the arc discharge if such an arc discharge occurs.

In view of heat generation during operation, inductor is the most desirable element which is used to compose the arc discharge current-limiting circuit (1). An inductor of coreless- or core-type such as winding iron core-type and laminating iron-type, or highly-efficient and space-saving type such as troidal coil can be used as the inductor, as long as it limits arc discharge current when connected with the ac terminal of the rectifier circuit bearing a smoothing capacitor C. The inductance of such inductor is chosen in such manner that the resonance circuit formed together with the smoothing capacitor C advances the phase difference between the voltage and current components in arc discharge current, in other words, decreases its effective power.

The use of an inductor with a relatively low dc resistance results in a less heat generation by the inductor per se, as well as in an effective limitation of arc discharge current. For example, in the case of lighting an argon lamp, rated voltage of 100–110 volts, rated wattage of 40–60 watts, with a dc voltage in then range of about 105–125% of its rating, a desirable inductance lies in the range of about 1 to about 10 millihenries when the capacitance of the smoothing capacitor C is about 30–100 microfarads. The arc discharge current-limiting circuit (1) also limits switch-on rush currents into argon lamp and smoothing current which will be described hereinafter.

The filament resistance of argon lamp at ambient temperature is several tenth parts of that in incandescent state. With this reason, the application of a voltage exceeding the rating of argon lamp results in a rush current which may reach up to several folds of stationary current or higher to accelerate the vaporization and burnout of the lamp filament. The rush current-limiting circuit (2) is to limit such a rush current and also to prevent the shortening of life due to the rush current. The rush current-limiting circuit (2) usually comprises a current limiting means such as resistor which is connected in series with argon lamp, a thyristor having a main current path connected in parallel with the current limiting means, and a triggering circuit which delays the conduction of the thyristor by a prescribed time after switch-on. The resistance of the current limiting means is chosen in such manner that its combined resistance with the filament at ambient temperature is approximately the same as the filament resistance in incandescent state.

With this arrangement, the current limiting means is left connected in series with argon lamp over the prescribed time to limit possible rush current and also to preheat the filament. After a lapse of the prescribed time, the thyristor is triggered to bypass the current limiting means to supply to argon lamp a voltage exceeding its rating. Thus, the rush current into argon lamp can be extremely reduced or even eliminated.

Figure 2:
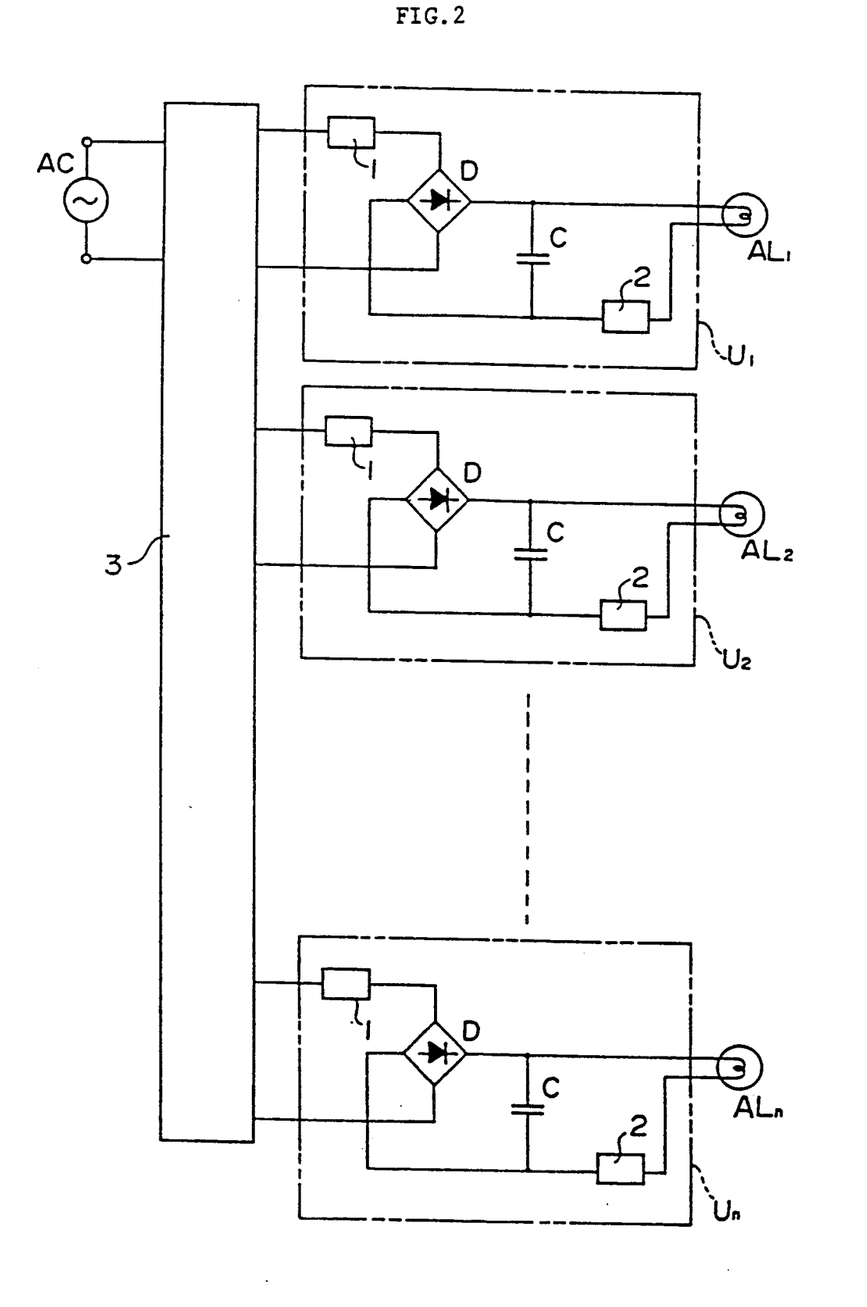
FIG.2 is a block diagram of a lighting system using lighting units according to the invention.

FIG. 2 is an example of a lighting system wherein a plurality of lighting units as shown in FIG. 1 are controlled by a lighting control device using, for example, dimming and switching circuits.

More particularly, in this lighting system, a plurality of lighting units $U_1, U_2 \ldots U_n$ respectively comprising a rectifier circuit bearing a smoothing circuit as shown in FIG. 1, an arc discharge current-limiting circuit, and a rush current-limiting circuit are equipped with argon lamps $AL_1, AL_2 \ldots AL_n$ having a desired rated wattage, and connected with an ac source AC through a lighting control device (3) which bears, for example, dimming and switching circuits.

The lighting control device (3) and the power sources and argon lamps in respective lighting units can be located as follows: For example, the lighting control device (3) and power sources are located at the same place, while the argon lamps are located at desired places in houses and facilities such as library, school, studio, beauty salon, hospital, factory, office, "ryokan", hotel, restaurant, banquet hall, wedding hall, conference hall, store, shop, supermarket, department store, art museum, museum, concert hall, hall, airplane, vehicle, swiming pool, gymnasium, poultry farm, fish farm and plant factory. Alternatively, the lighting control device (3) is located at an appropriate place in houses and facilities, while a plurality of units containing a power source and an argon lamp are located at desired places in the houses and facilities.

Figure 3:
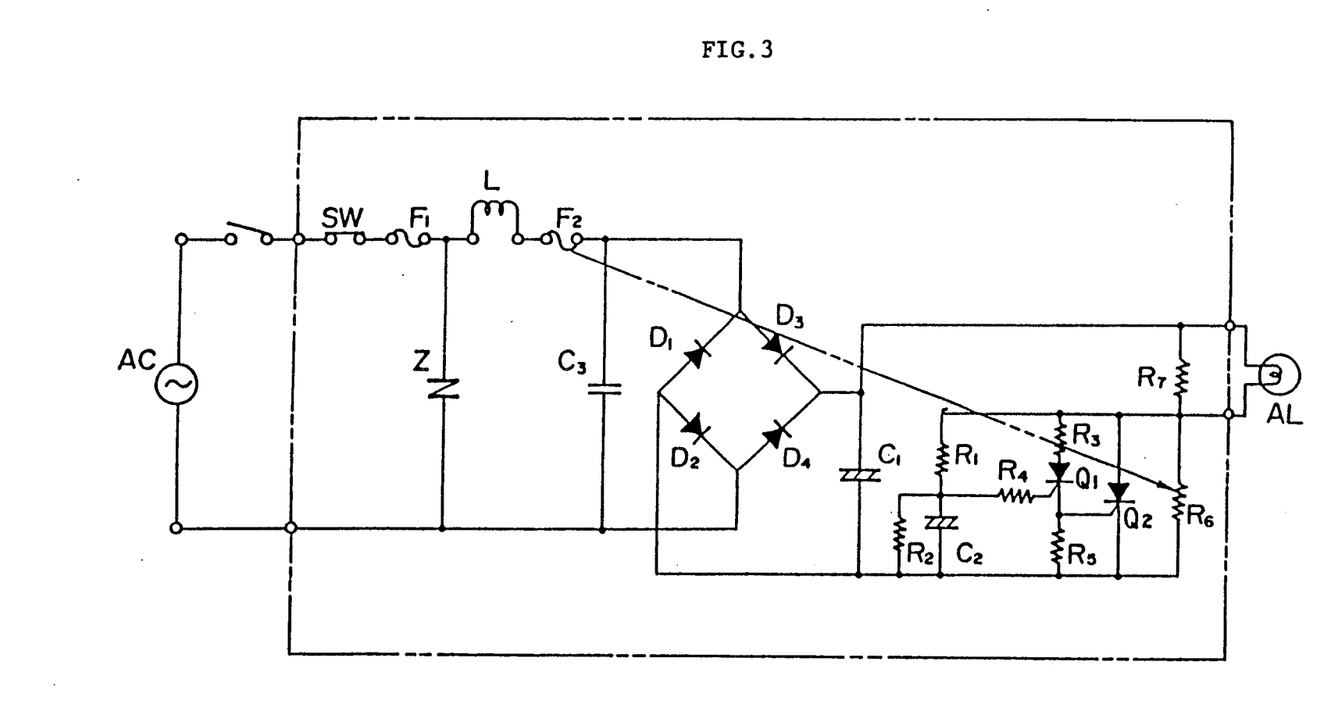
FIG.3 is an electric circuit of an embodiment according to the invention.

FIG. 3 shows an electric circuit of the lighting device or unit as shown in FIG. 1 or 2. In FIG. 3, an ac terminal of a bridge rectifier consisting of rectifier diodes $D_1, D_2, D_3$ and $D_4$ is connected with a power source AC through a power switch SW, fuses $F_1$ and $F_2$ and inductor L, while a dc terminal of the bridge rectifier is connected with a smoothing capacitor $C_1$ and an argon lamp AL through a triggering circuit consisting of resistors $R_1, R_2, R_3, R_4$ and $R_5$, a capacitor $C_2$ and thyristors $Q_1$ and $Q_2$, and through a resistor $R_6$ as rush current-limiting circuit.

A capacitor $C_3$ and a zener diode Z both connected with the ac terminal of the bridge rectifier are to absorb pulse voltages which may occur at the ac terminal to stabilize its input voltage. The resistor $R_6$ and fuse $F_2$ are arranged to operate in association so that, if the temperature of the resistor $R_6$ increases with an abnormality, the fuse $F_2$ melts off to automatically break the main current circuit.

The operation of this example will be explained hereinafter. When the power switch SW is closed, an ac current from the ac source AC is subjected to full-wave rectification by the bridge rectifier and smoothed by the smoothing capacitor $C_1$, and the dc voltage across the smoothing capacitor $C_1$ is applied to the series circuit of the argon lamp AL and resistor $R_6$.

While charging of the capacitor $C_2$ in the triggering circuit is initiated immediately after switch-on of the power switch SW, and, after a lapse of the time as determined by the time constant of the resistor $R_4$ and capacitor $C_2$, the voltage across the capacitor $C_2$ is applied to a gate of the thyristor $Q_1$ to bring it into conduction. The conduction current through the thyristor $Q_1$ is applied in turn to a gate of the thyristor $Q_2$ to bring it conduction. Conduction of the thyristor $Q_2$ bypasses the resistor $R_6$ connected in parallel with a main current path of the thyristor $Q_2$. Thus, a prescribed voltage is applied to the argon lamp AL.

Since the filament resistance of the argon lamp AL immediately after switch-on of the power switch SW is several tenth parts of that in incandescent state, any shortening of its life due to rush current can be prevented by setting the resistor $R_6$ in such manner that its combined resistance with the filament is approximately equal to its resistance in incandescent state. In this case, by setting the above described time constant long enough to preheat the filament of the argon lamp AL, the rush current into the argon lamp AL can be substantially eliminated.

Furthermore, this example has the merits that the thyristor $Q_2$ can be triggered with a relatively small current because in this example two thyristors are used in cascade connection, and that, even when the ambient temperature greatly varies, the triggering circuit is much more surely operated than in the case of using only one thyristor.

If the filament of the argon lamp AL is burn out, an arc discharge occurs between the resultant filament gap and a sudden arc discharge current may flow into the main current circuit. The inductor L provided at the ac terminal of the bridge rectifier effectively makes a loss on any current surge into the main current circuit to suspend such an arc discharge current and also to stop the arc discharge per se. If the arc discharge restores, it is suppressed again by the inductor L and never continues even after the filament gap is enlarged. Furthermore, if the power switch SW is still closed after the arc discharge is stopped, the arc discharge never restore because the filament has been burn out.

Since this example is arranged in this way, a flickerless, natural light having both a color temperature of about 2,900 K. or higher, desirably, in the range of about 2,950–3,050 K. and superior color rendering properties can be obtained with an argon lamp for long time by energizing a dc voltage exceeding its rating, desirably, in the range of about 105–125% thereof.

Furthermore, this example can be safely used because, if burnout of filament arises an arc discharge, it effectively limits the current surge due to the arc discharge.

Figure 4:
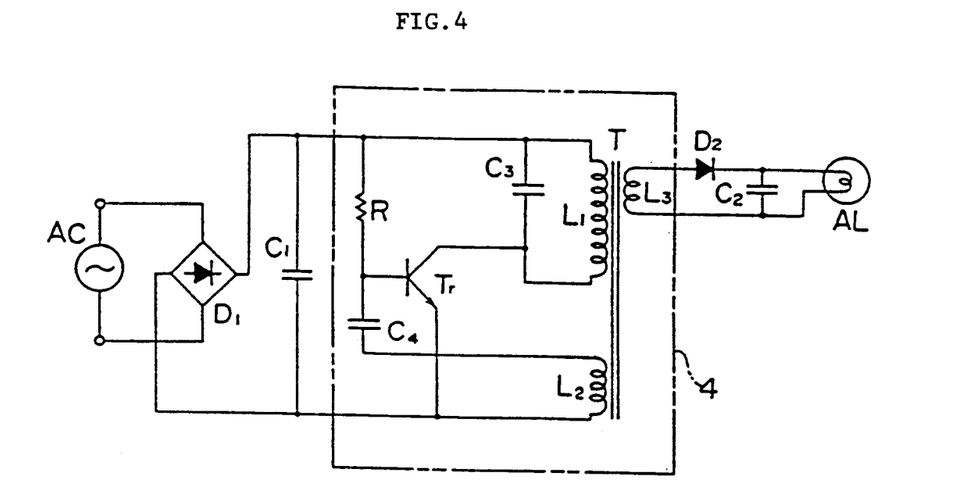
FIG.4 is an electric circuit of another embodiment according to the invention.

FIG. 4 is an electric circuit of another embodiment according to the invention using an inverter circuit. An ac terminal of a bridge rectifier $D_1$ is connected with an ac source AC, while a dc terminal of the bridge rectifier $D_1$ is connected with a smoothing capacitor $C_1$. An input terminal of an inverter circuit (4) generating a high-frequency current is connected between both ends of the capacitor $C_1$, while an output terminal of the inverter circuit (4) is connected through a rectifier diode $D_2$ with an integration circuit comprising a capacitor $C_2$. An argon lamp AL is connected between both ends of the capacitor $C_2$.

In the inverter circuit (4) is provided an inverter transformer T and a transistor Tr, and a capacitor $C_3$ is connected in parallel with a primary winding $L_1$ of the inverter transformer T. Both ends of the capacitor $C_3$ are connected with a positive end of the smoothing capacitor $C_1$ and a collector of the transistor Tr. One end of a base winding $L_2$ of the inverter transformer T is connected with a base of the transistor Tr through a capacitor $C_4$, while the other end of the base winding $L_2$ is connected with a negative end of the smoothing capacitor $C_1$. The base of the transistor Tr is also connected with a positive end of the smoothing capacitor $C_1$ through a resistor R. A second winding $L_3$ of the inverter transformer T provides an output terminal of the inverter circuit (4), and particular circuit constants of the inverter circuit (4) and capacitor $C_2$ are chosen in such manner that the voltage across the argon lamp AL exceeds the effective voltage of the ac source AC, desirably, in the range of about 105–125% thereof, as well as that the current across the filament is, desirably, in the range of about 105–125% thereof.

Now explaining the operation of this example, when the ac power source AC is closed, the ac current therefrom is subjected to full-wave rectification by the bridge rectifier $D_1$, and smoothed by the smoothing capacitor $C_1$ into a pulsating or a dc current which is then supplied to the inverter circuit (4). This induces the oscillation of the inverter circuit (4) to output a high-frequency voltage at the secondary winding $L_3$ of the inverter transformer T. The high-frequency voltage is subjected to half-wave rectification by the diode $D_2$, integrated by the capacitor $C_2$, and supplied to the argon lamp AL.

Since this example is arranged in this way, a natural light having both a color temperature of about 2,900 K. or higher, desirably, in the range of about 2,950–3,050 K. and superior color rendering properties can be obtained with an argon lamp over a long time period by lighting it with a voltage exceeding its rating, desirably, in the range of about 105–125% thereof.

Figure 5:
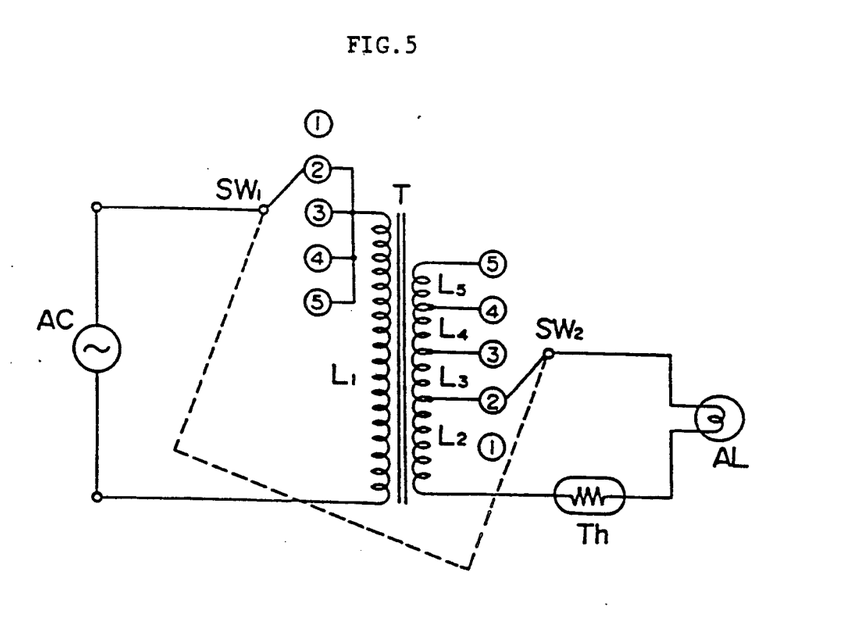
FIG.5 is an electric circuit of still another embodiment according to the invention.

FIG.5 is an electric circuit of still another embodiment according to the invention, wherein argon lamp is lighted by energizing an ac voltage exceeding its rating.

In this example, there is provided secondary windings $L_2$, $L_3$, $L_4$ and $L_5$ having respective winding ratio, for example, of 100:12, 100:13, 100:14 and 100:15 against a primary winding $L_1$, and a power switch $SW_1$ is provided in such manner that it can be operated in association with a switch $SW_2$ which is used to switch the secondary windings. Thus, the voltage across the argon lamp AL can be freely changed in the range of 12–15 volts. Furthermore, a thermistor Th is provided in the secondary circuit of the transformer T so that rush current due to switch-on of the power switch $SW_1$ is limited by utilizing the property of thermistor that its electric resistance lowers as the ambient temperature increases.

Since this example is arranged in this way, a natural light having a slight flicker but having a color temperature of about 2,900 K. or higher, desirably, in the range of about 2,950–3,050 K. can be obtained with an argon lamp over a long period of time by lighting it with an ac voltage exceeding its rating, desirably, in the rage of about 105–125% thereof.

Furthermore, this example can be simplified because the transformer T also limits rush current due to switch-on of the power switch $SW_1$, and the attachment of the transformer T to the bottom of the lighting device helps it to stabilizes its settlement.

Although in FIG.5 only one argon lamp is attached to the lighting device, of course, a plurality of argon lamps can be simultaneously lighted with one lighting device when the total wattage of the argon lamps are within the power capacity of the transformer T.

The following is the results of an experiment wherein two typical argon lamps were lighted by energizing a dc voltage in order to clarify any relationship between the dc voltage and the color temperature of the obtained light.

In the experiment, eight sets of a lighting device described in FIG.3 were attached with either type of commercialized argon lamp (referred to as "Sample A" or "Sample B" hereinafter), while the smoothing capacitor $C_1$ in each set was set such that the dc voltage across the argon lamps was variable in the range of about 100–130% of their rating. An commercial ac line, frequency of 60 hertz, was used as the ac power source.

The voltage across the argon lamps was determined in usual manner, while the color temperature of the emitted light was determined in a box with black inside walls at a position 40 cm right down to the argon lamps using "COLOR METER II", a color temperature measuring apparatus commercialized by Minolta Camera Co., Ltd., Osaka, Japan.

Figure 6:
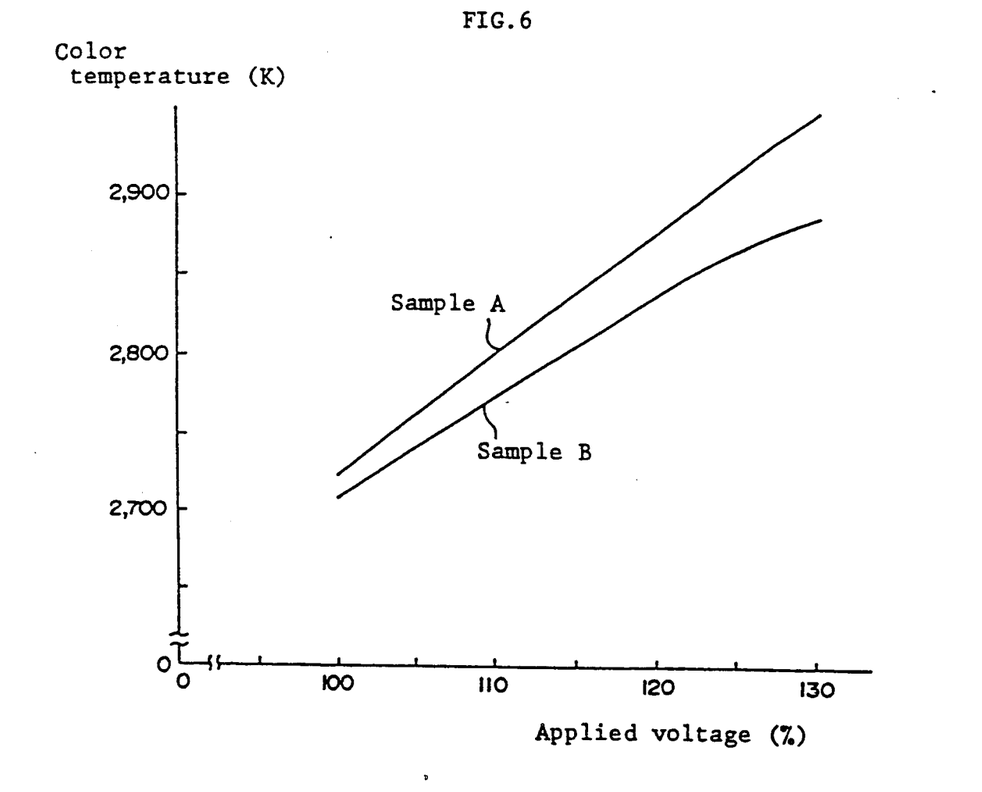
FIG.6 is a graph showing the relationship between the dc voltage across an argon lamp and the color temperature of the emitted light.

The results were as shown in FIG.6.

As evident from the results in FIG.6, in the case of Sample A, the color temperature of the emitted light increased proportionally to the applied voltage in the range of 100–130% of its rating. Thus, Sample A emitted a light having a color temperature of about 2,900K. or higher when energized with a dc voltage exceeding about 122% of the rating.

While in the case of Sample B, the color temperature of the emitted light was relatively lower, i.e. up to about 2,850 K., even when energized with a dc voltage of about 120% of its rating similarly as in the above. The color temperature increased no longer proportionally to a dc voltage of about 124% or higher of the rating, and the energization of a dc voltage up to about 130% of the rating, which might cause burnout of the filament, attained a color temperature of only about 2,890 K.

More particularly, the present inventor found that there are at least two types of argon lamp: One type does attain a color temperature increasing proportionally to the applied voltage to emit a natural light having both a color temperature of about 2,900 K. or higher and superior color rendering properties. The other type yields no desired light which is natural, tender to the eyes and superior in color rendering properties because the color temperature does not increase proportionally to the applied overvoltage and reaches an uppermost far about 2,900 K.

These confirm that the argon lamps feasible in the invention are those whose color temperature, desirably, about 2,900 K. or higher, in particular, in the range of about 2,950–3,050 K., is in direct proportion to the applied overvoltage.

The present invention is based on this first finding that the lamps which are categorized into "argon lamp" can be grouped into one type which emits a natural light having both a color temperature of about 2,900 K. or higher and superior color rendering properties when energized with an overvoltage, and another type which emits a light with a color temperature far about 2,900 K. when energized with an overvoltage.

The reason for such difference is in investigation.

Assuming the reasons that this fact have never been revealed hitherto, conventionally, any effort have been made to operate lamps, of course, including argon lamp at a voltage carefully set to their rating in order to maximize their service life. Consequently, no one has studied argon lamps on their behaviors, .in particular, color temperature, color rendering properties and effects on the eyes, when lighted by energizing a voltage exceeding their rating as in the case of the present invention.

Nowadays, trend towards health can be found in many fields. The present invention is directed to ocular health to which so much attention has never been drawn. Thus, the present invention would extend the use of argon lamps.

As described above, since in the present invention, an argon lamp is lighted by energizing a voltage exceeding its rating, a light at a color temperature of about 2,900 K. or higher which is natural, superior in color rendering properties and suitable for general lighting can be obtained with the argon lamp for long time.

Furthermore, the present lighting device attains a flickerless and less eyestrain-causative light when lighted by energizing a dc voltage exceeding the rating.

In addition, in the case of lighting argon lamp with a dc voltage obtained by rectifying an ac voltage with a rectifier circuit bearing a smoothing means, one argon lamp can be used for longer time by providing an arc discharge currentlimiting circuit and a rush current-limiting circuit respectively at an ac terminal and a dc terminal of the rectifier circuit.

Accordingly, the present lighting device can be advantageously used for lighting of various houses and facilities such as library, school, studio, beauty salon, hospital, factory, office, "rhyokan", hotel, restaurant, banquet hall, wedding hall, conference hall, store, shop, supermarket, department store, art museum, museum, concert hall, hall, airplane, vehicle, swiming pool, gymnasium, poultry farm, fish farm and plant factory.

Further, since the present lighting device provides a natural light which is close to morning sunlight and exhibits remarkable effects in the prevention and treatment of diseases, for example, pseudomyoxia, asthenopia and depression, as well as in the improvement of growth and productivity of animals and plants, the present lighting device can be advantageously used as luminare for farms and factories such as poultry farm, fish farm and plant factory.

The present invention attaining such remarkable effects would greatly contribute to the art.

While the invention has been particularly shown and described with reference to the preferred embodiments thereof, it will be understood by those skilled in the art that the foregoing and other changes in form and details can be made therein without departing from the spirit and scope of the invention.

I claim:

1. A lighting device comprising:
   an argon lamp used as a light source and having a rated wattage of about 25 watts to about 150 watts;
   a power source capable of supplying to said argon lamp a voltage exceeding its rating;
   said power source having an output terminal connected to said argon lamp; and
   said argon lamp achieving a less visual fatigue-causative light having a color temperature of substantially 2,900 K. or higher when a voltage of about 105% to about 125% of the rating is applied from said power source.

2. The lighting device of claim 1, wherein said argon lamp achieves a total flux of about 1,000 lumens or higher when in lighting.

3. The lighting device of claim 1, wherein said power source is a dc power source.

4. The lighting device of claim 1, wherein said power source supplies a dc voltage obtained by rectifying and smoothing an ac voltage with a rectifier circuit bearing smoothing means.

5. The lighting device of claim 1, wherein an arc discharge current-limiting circuit and a rush current-limiting circuit are provided respectively at an ac terminal and a dc terminal of the power source.

6. The lighting device of claim 1, which achieves a service life of about 50 hours or longer.

7. The lighting device of claim 1, which contains an inverter circuit.

8. A lighting device achieving less visual fatigue, comprising:
   a light source comprising an argon lamp having a rated wattage of about 25 watts to about 150 watts and capable of achieving a total flux of at least 1000 lumens when lit;
   a dc voltage source capable of supplying to said argon lamp a voltage exceeding its rating, said dc voltage source having an output terminal connected to said argon lamp;
   said dc voltage source and said argon lamp constituting means for achieving a less visual fatigue-causitive light having a color temperature of at least 2900 K. when a voltage of about 105% to about 125% of the rating is applied from said dc voltage source.

* * * * *